United States Patent [19]
Keel et al.

[11] Patent Number: 5,402,074
[45] Date of Patent: Mar. 28, 1995

[54] THIN FILM MAGNETIC HEAD HAVING ELECTRICAL CONNECTION TO CORE

[75] Inventors: Beat G. Keel, Prior Lake; Brian G. Ehalt, Orono, both of Minn.

[73] Assignee: Seagate Technology, Inc., Scotts Valley, Calif.

[21] Appl. No.: 62,635

[22] Filed: May 13, 1993

[51] Int. Cl.⁶ .......................................... G01R 27/26
[52] U.S. Cl. ................................ 324/551; 324/546; 360/103
[58] Field of Search .............. 360/103; 324/551, 546, 324/522, 525

[56] References Cited

U.S. PATENT DOCUMENTS

| | | | |
|---|---|---|---|
| 4,317,149 | 2/1982 | Elser et al. | 360/126 |
| 4,457,114 | 7/1984 | Hennenfent et al. | 51/216 |
| 4,477,968 | 10/1984 | Kracke et al. | 29/603 |
| 4,511,942 | 4/1985 | Valstyn | 360/126 |
| 4,559,743 | 12/1985 | Kracke et al. | 51/165 |
| 4,739,562 | 4/1988 | Kracke et al. | 33/567 |
| 4,800,454 | 1/1989 | Schwarz et al. | 360/103 |
| 4,841,625 | 6/1989 | Valstyn | 29/603 |

FOREIGN PATENT DOCUMENTS

| | | | |
|---|---|---|---|
| 0059178 | 4/1982 | Japan | 324/546 |
| 0091400 | 6/1982 | Japan | 324/546 |
| 02211173 | 12/1983 | Japan | 324/546 |
| 0245271 | 4/1987 | Japan | 324/546 |
| 0086109 | 4/1988 | Japan | 360/103 |
| 0155420 | 6/1988 | Japan | 360/103 |
| 0046512 | 2/1990 | Japan | 360/113 |
| 0133666 | 10/1991 | Japan | 324/546 |
| 4069675 | 1/1992 | Japan | 324/546 |

OTHER PUBLICATIONS

IBM Technical Disclosure Bulletin vol. 25 No. 7A Dec. 1982 Hitchner et al.

*Primary Examiner*—Kenneth A. Wieder
*Assistant Examiner*—Maura K. Regan
*Attorney, Agent, or Firm*—Edward P. Heller, III

[57] ABSTRACT

In accordance with the present invention, an apparatus and process for convenient electrical access following application of an overcoat layer to the core of a thin film transducer for measuring core-to-coil impedance and breakdown voltage during manufacture and final testing is disclosed. The invention may employ existing process feedback circuitry at the wafer level typically severed in the machining process or the invention provides for a permanent dedicated terminal on the support structure.

1 Claim, 5 Drawing Sheets

THIN FILM MAGNETIC HEAD HAVING ELECTRICAL CONNECTION TO CORE

REFERENCE TO CO-PENDING APPLICATION

Reference is hereby made to co-pending patent application titled "Thin Film Magnetic Head Having Core To Coil Over-Voltage Protection", Ser. No. 08/062,667, filed on even date herewith and assigned to the same assignee.

FIELD OF THE INVENTION

The present invention relates to recording heads employed in magnetic data storage devices, particularly to thin film transducers used in such heads.

BACKGROUND OF THE INVENTION

Disk and tape drive data storage devices may employ thin film magnetic transducers positioned proximate a magnetic surface of a storage medium such as a hard disk or tape. Hard disk drive data storage devices typically employ thin film magnetic transducers carried on a somewhat conductive ceramic slider designed for aerodynamic suspension above a rigid rotating disk so as to position the transducer magnetic core tips as closely as possible to the magnetic surface coating of a disk.

A typical read/write head includes a magnetic core having an air gap to record magnetic transitions on the magnetic surface of the medium during a write operation and to sense such transitions during a read operation. The core is magnetically linked to a coil. Electrical current in the coil during a write operation generates magnetic flux in the core to record transitions in the surface magnetic coating of a disk or other medium. During a read operation a voltage is induced in the coil as recorded transitions pass the air gap. Insulating layers electrically isolate the coil, core and supporting structure, such as a slider, from each other.

The core defines pole tips which are exposed at a surface opposing the storage medium. In a disk drive head, for example, the pole tips are positioned on the air bearing surface of the slider. It is desirable to minimize the distance between the surface of the storage medium and the pole tips. This distance is typically maintained at or below a few micro inches. Coil electrical potential typically differs from that of the recording medium. Pole tip potential should be held close to that of the medium to prevent electrical discharge across the small air gap separating the medium surface from the pole tips. Such discharge produces electrical noise which interferes with the read operation and damages the pole tips and medium thereby reducing operational reliability. Typically coil to disk surface voltage is not near zero during write/read operations.

The impedance of the insulation separating coil and core must be high to prevent the core and pole tips from reaching coil potential. The breakdown voltage of coil to core insulation is typically below 1000 volts. Such insulation is therefore sensitive to overvoltages accidentially applied during fabrication, head installation, and shipping. Core-to-coil insulators are easily damaged during fabrication and use. For example, electrostatic charges can accumulate on the conductors of the magnetic circuits of the transducer, especially during head fabrication, and arc from coil to core and from core to support structure causing pole tip erosion and damaging the core to coil insulating layer thereby lowering coil to core impedance. Once such impedance is lowered, the core will assume coil potential, eventually resulting in damaging head to disk contact.

During fabrication and installation in the tape or disk storage device, it is desirable to monitor transducer core to coil insulator quality using impedance and breakdown voltage measurements. In state of the art thin film read/write heads, the core is accessible for such measurements exclusively at the tiny pole tips exposed on the delicate air bearing surface. Probing these tips is difficult and potentially damaging to the air bearing surface. Electrically connecting the core to an easily accessible structure such as a measuring pad is a primary objective of the present invention.

SUMMARY OF THE INVENTION

The present invention provides an easily accessible terminal pad electrically connected to the core of a thin film magnetic transducer. This core terminal pad has dimensions similar to those of terminal pads electrically connected to the coil. This core terminal pad is preferably located on the support structure itself for use up to the time of installation of the head into the disc or tape storage device.

In applications where space limitations or other considerations require installing the core terminal pad beyond the final support structure, the core may be connected to an existing terminal employed in conjunction with auxilliary circuitry designed to provide fabrication process feedback such as strain or temperature. Since such auxilliary circuitry is typically severed from the support structure during a fabrication step such as final machining, use of the auxilliary circuitry terminal pad as a core access terminal is possible only up to the time of separation.

The present invention provides means for measuring core-to-coil insulator quality by means of impedance and breakdown voltage measurement without touching the small fragile pole tips exposed at the surface opposing the recording medium. Since the core terminal pad has dimensions similar to that of the core terminal pads, such measurements can be performed on production equipment at the time coil impedance is measured.

Other objects and advantages of the present invention will become apparent from the following description taken in conjunction with the accompanying drawings and attached claims.

The invention, together with further objects and advantages thereof, may best be understood with reference to the following description taken in conjunction with the accompanying drawings.

DESCRIPTION OF THE INVENTION

Figure 1:
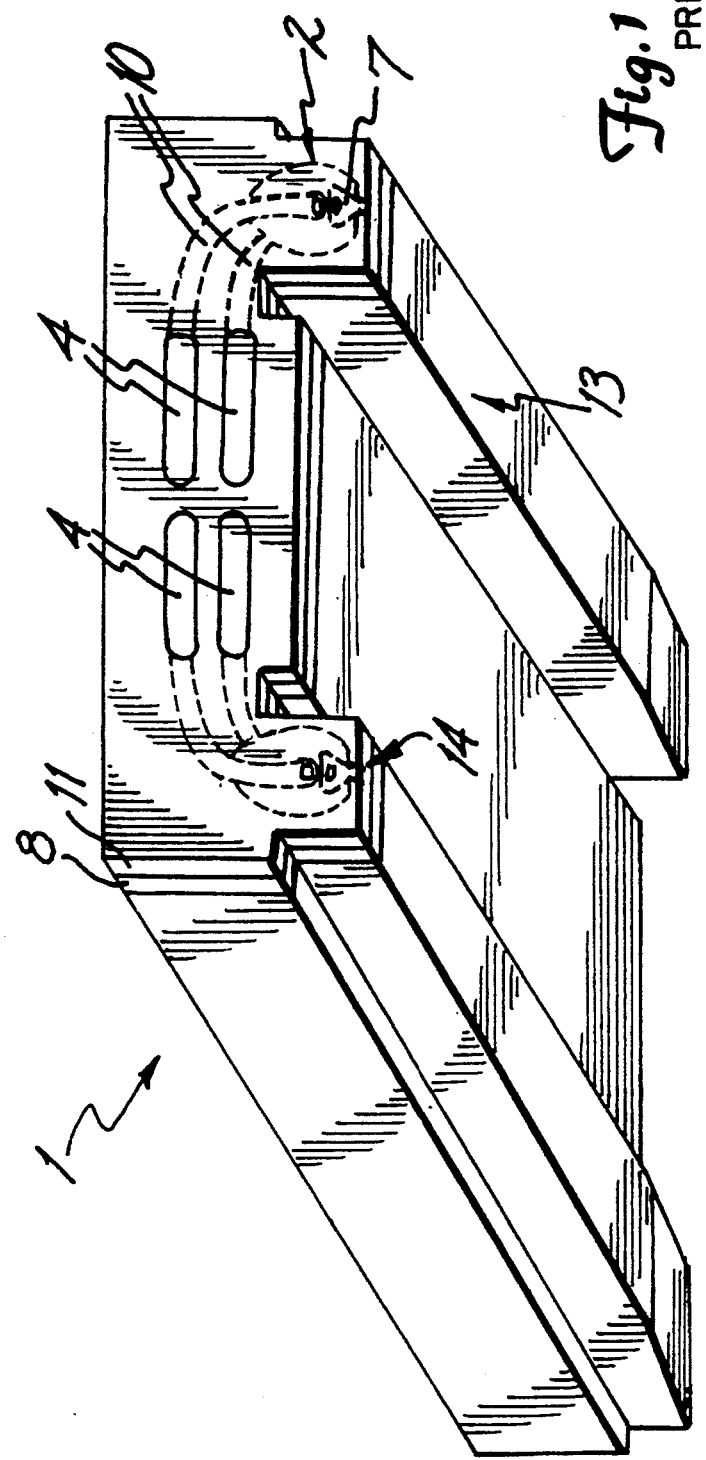
FIG. 1 is a perspective view of a slider having a pair of thin film magnetic read/write heads.
Figure 2:
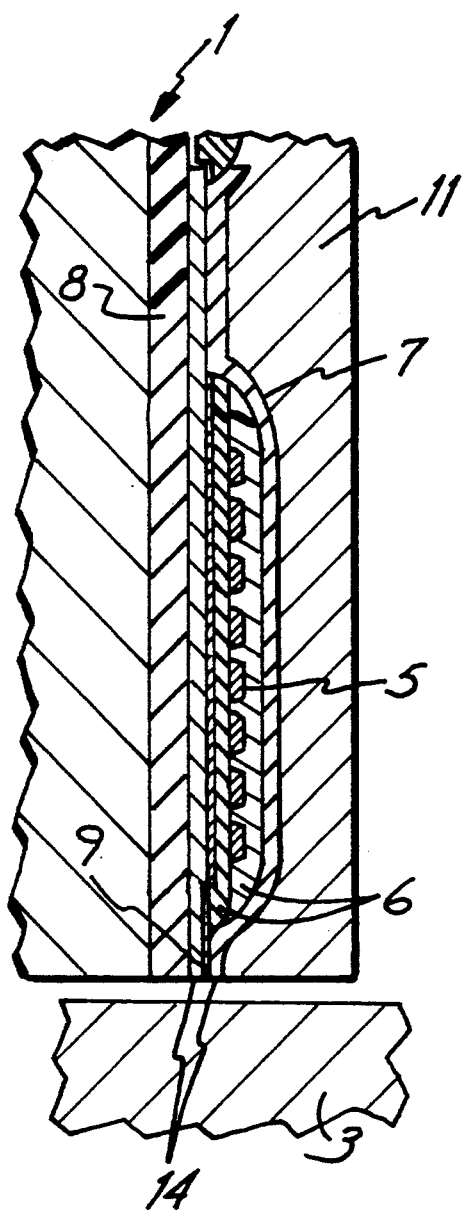
FIG. 2 is a side cross-sectional view of a portion of a typical magnetic read/write head shown in FIG. 1.
Figure 3:
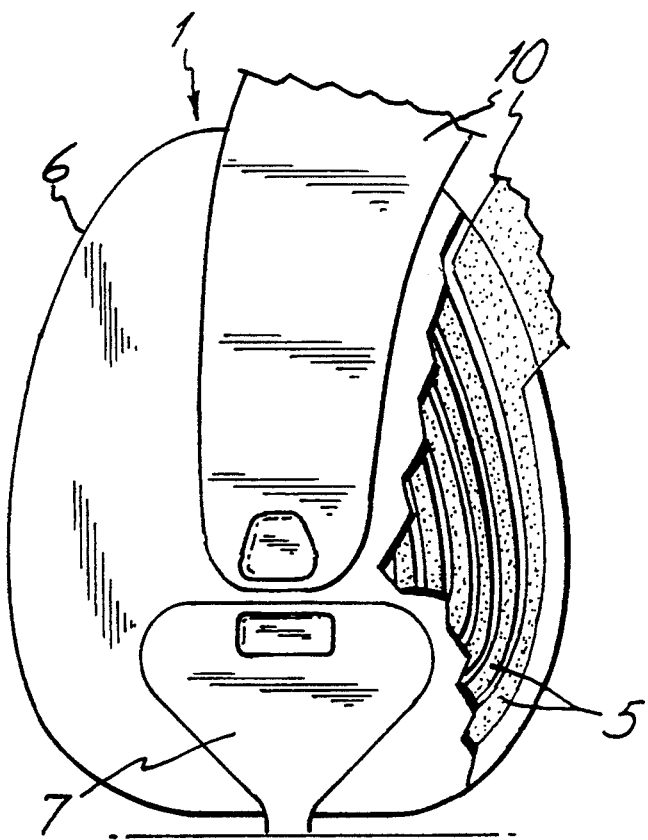
FIG. 3 is a plan view of the head of FIG. 2.

Referring to FIGS. 1, 2 and 3, thin film magnetic recording heads 2 are typically mounted or integrally fabricated onto an electrically conductive support structure such as a slider 1. Magnetic core 7 is electrically conductive and possesses high magnetic permeability. Core 7 terminates in a pair of pole tips 14 separated by recording gap 9. Tips 14 are exposed at air bearing surface 13 opposite magnetic recording medium 3. The ends of coil 5 define linkages 10. Coil 5 is separated from core 7 by insulator 6. Core 7, coil 5, coil terminals 4 and coil linkages 10 are separated from support structure 1 by insulator layer 8 and are typically encapsulated by an insulating overcoat layer 11.

When resistivity between coil 5 and core 7 is low, electrical charge can leak through insulator 6 to the core which then assumes coil potential which is different from the potential of recording medium 3. Since core pole tips 14 are close to the surface of medium 3, electrostatic discharge between tips 14 and medium 3 can occur thereby creating intermittent electrical noise and resulting read errors. In disk drive data storage devices, for example, core pole tips 14 are about 2 to 4 micro inches away from the disk surface. Further, material may transfer between the recording medium 3 and core pole tips 14 during such discharge leading to deterioration of reliability and destruction of the head-medium interface. In disk drive applications, disk surface media may transfer to tips 14 during such discharge resulting in potentially destructive head to disk contact.

The spacing between coil 5 and magnetic core 7 is generally greater than 2 microns. Insulator 6 typically provides in excess of 10 megaohms of core to coil impedance with a breakdown voltage $V_{bd}$ exceeding 500 volts. Thousands of volts between coil and core can be generated during head fabrication, shipping or installation. Such electrostatic discharge is particularly destructive of head insulation.

Figure 4:
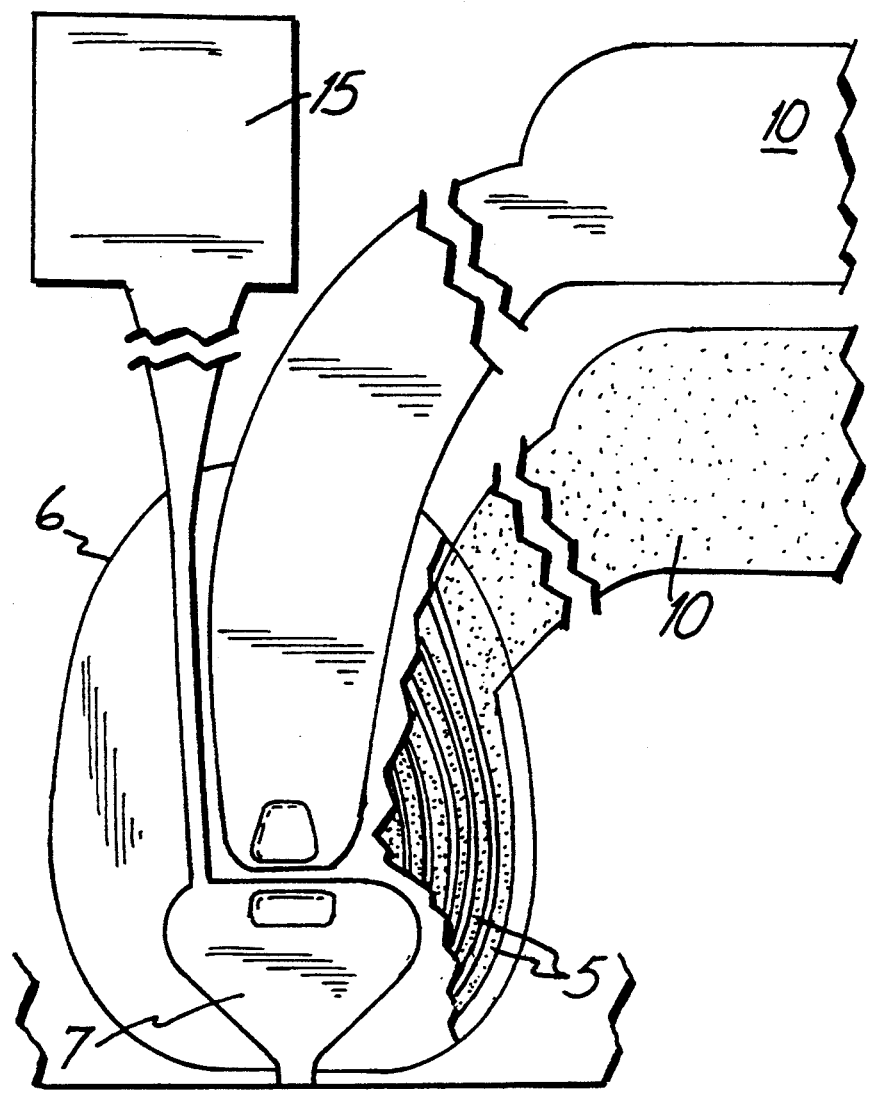
FIG. 4 is a plan view of a first embodiment of a magnetic read/write head of the present invention having permanent structure electrically connected to core.

FIG. 4 illustrates a first embodiment of the present invention. A partially fabricated inductive read/write disk drive head prior to application of insulating overcoat layer 11 is shown. Each end of coil 5 is electrically connected to a respective coil linkage 10. Similarly, magnetic core 7 extends to linkage 15. Linkages 10, 15 are easily accessible during head fabrication for in-process monitoring of coil to core impedance without actually contacting the easily damaged magnetic core 7 and coil 5. Coil and core linkages 10, 15 can be fabricated of any electrically conductive material.

Figure 5:
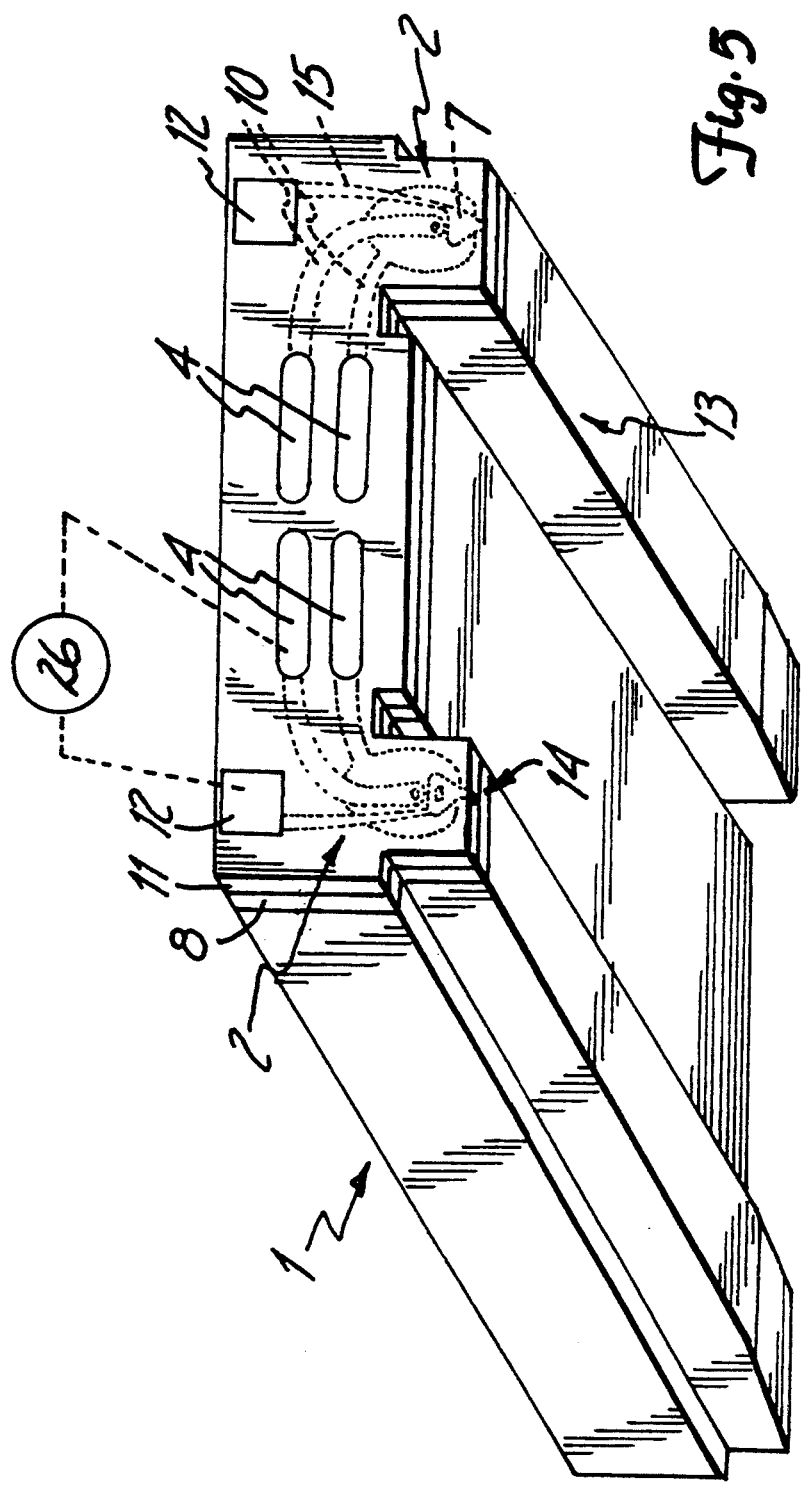
FIG. 5 is a perspective view of a slider having a pair of thin film magnetic read/write heads of the embodiment of FIG. 4 of the present invention.

FIG. 5 depicts a first embodiment of the present invention installed on a support structure comprising a finished slider 1 of an inductive read/write head for a disk drive data storage device. Core terminal 12 is exposed above overcoat insulator 11 and connected to link 15 as are coil terminals 4 to coil linkages 10 shown in FIG. 4.

Figure 6:
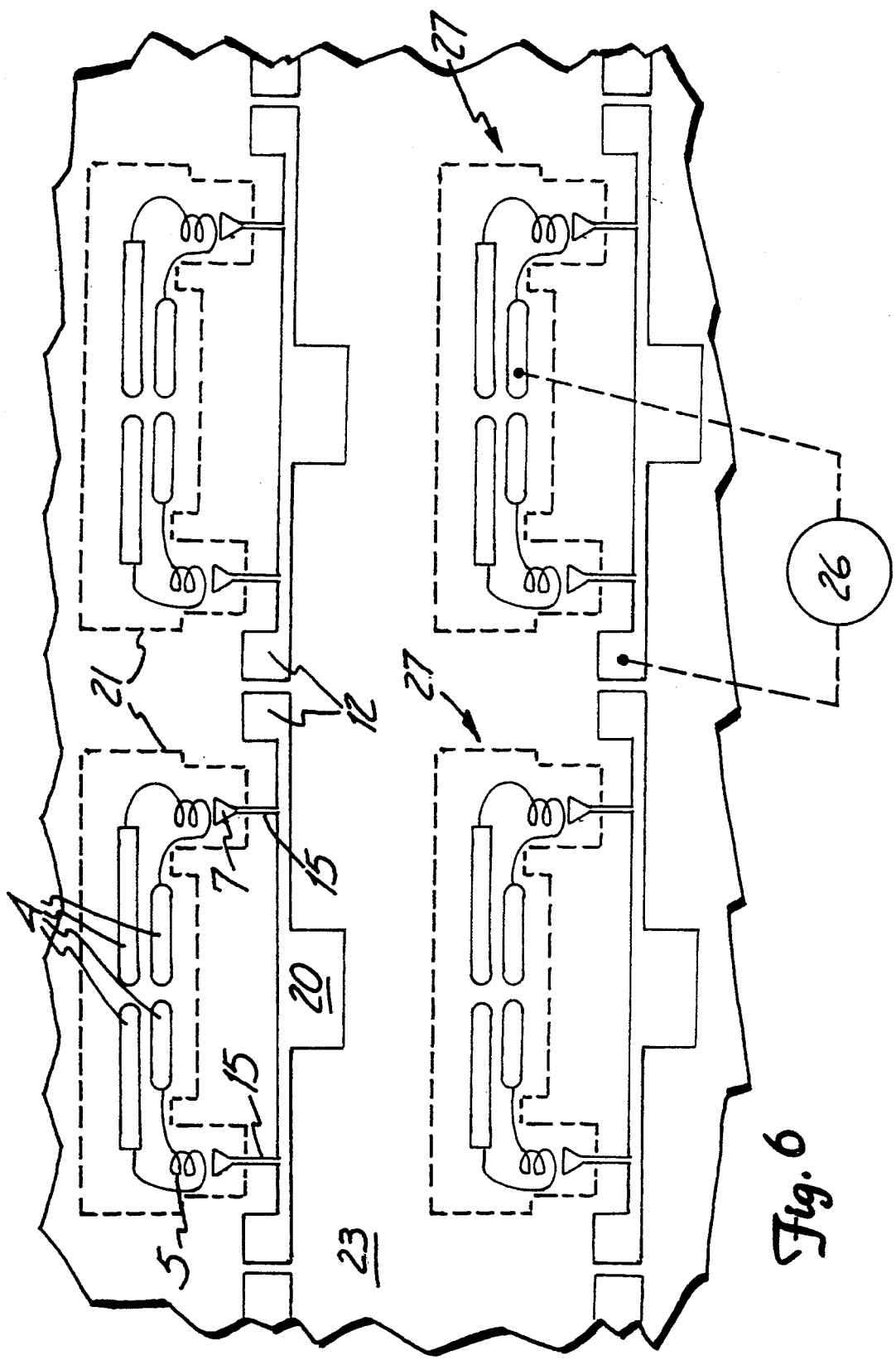
FIG. 6 is a plan view of a wafer prior to machining having a plurality of thin film read/write heads and a multi-purposed core pad positioned off the slider according to an alternative embodiment of the present invention.

FIG. 6 depicts a portion of wafer 23 prior to machining into sliders 27. Dotted lines 21 outline individual sliders 27. Wafer 23 defines a plurality of inductive read/write heads constructed according to a second embodiment of the present invention. Magnetic core 7 is electrically connected to core terminal pad 12. Coil 5 is connected to coil terminals 4. In this embodiment core terminal pad 12 is shared with auxilliary circuit 20 employed during fabrication to monitor process parameters such as temperature, stress and layer to layer alignment. According to this design, core-to-coil impedance can not be easily measured following the machining operation since the electrical connection between core and terminal is severed.

Each wafer 23 is fabricated by depositing coils 5 and magnetic cores 7 on substrate 1 over an insulating base coat 8. Insulating overcoat layer 11 is then applied thereby encapsulating core 7, as best seen in FIG. 2. It has been heretofore impractical to test core-to-coil impedance and breakdown voltage following application of such an overcoat layer.

Impedance measurement means such as ohmmeter 26 may be readily connected to selected pair of terminals 4,12 in FIGS. 5 or 6 to measure the electrical impedance of core-to-coil insulator 6 in a respective head 2. Selected pairs of terminals 4,12 may also be employed to measure the breakdown voltage of a respective insulator 6. Such measurement can be accomplished by the application of successively higher voltage increments across a selected pair of terminals 4,12 to determine the voltage at which a significant drop in impedance is obtained.

Although the present invention is described with reference to specific embodiments, persons skilled in the art will recognize that changes may be made in form and detail without departing from the spirit and scope of the invention. For example, while the illustrated embodiments deal with insulation between coil and core, the invention may be employed in other magnetic recording applications such as measurements relating to shield-to-sense conductor insulation in magnetoresistive read heads used in data storage devices.

What is claimed is:

1. A method for measuring core to coil impedance of a thin film magnetic head at the wafer level comprising the steps of:
   a. integrally forming a support structure in a wafer;
   b. integrally forming a magnetic transducer having a coil and core and electrical insulation therebetween in the support structure;
   c. providing the support structure with first terminal means for electrical connection to the coil of said transducer;
   d. providing second terminal means in the wafer apart from the support structure;
   e. electrically connecting the core of said transducer to the second terminal means;
   f. connecting electrical measurement means across the first and second terminals:
   g. applying a first voltage and incrementally higher voltages in secession across the first and second terminal means;
   h. measuring coil to core impedance using the electrical measurement means of step f, following the application of each voltage of step g; and
   i. determining the voltage at which a significant drop in impedance is measured in step h.

* * * * *